United States Patent
McLain et al.

(10) Patent No.: US 11,413,667 B2
(45) Date of Patent: Aug. 16, 2022

(54) DESALINATION AND DECONTAMINATION SYSTEM FOR SOLID WASTE

(71) Applicant: Heartland Environmental Resources, LLC, Watonga, OK (US)

(72) Inventors: William F. McLain, Guthrie, OK (US); Douglas F. Presgrove, Purcell, OK (US)

(73) Assignee: Heartland Environmental Resources, LLC, Watonga, OK (US)

( * ) Notice: Subject to any disclaimer, the term of this patent is extended or adjusted under 35 U.S.C. 154(b) by 0 days.

(21) Appl. No.: 17/332,226

(22) Filed: May 27, 2021

(65) Prior Publication Data

US 2021/0370364 A1 Dec. 2, 2021

Related U.S. Application Data

(60) Provisional application No. 63/033,540, filed on Jun. 2, 2020.

(51) Int. Cl.
| | | |
|---|---|---|
| B09B 3/00 | (2022.01) | |
| B09B 3/40 | (2022.01) | |
| B01D 5/00 | (2006.01) | |
| B09C 1/08 | (2006.01) | |
| B09C 1/06 | (2006.01) | |
| B09C 1/10 | (2006.01) | |
| B09B 1/00 | (2006.01) | |
| B09B 3/80 | (2022.01) | |

(52) U.S. Cl.
CPC .............. *B09B 3/40* (2022.01); *B01D 5/006* (2013.01); *B09B 1/00* (2013.01); *B09B 3/80* (2022.01); *B09C 1/06* (2013.01); *B09C 1/08* (2013.01); *B09C 1/10* (2013.01)

(58) Field of Classification Search
CPC ....... B09B 3/00; B09B 3/0083; B09B 3/0016; B01D 5/00; B01D 5/006; B09C 1/06; B09C 1/08; B09C 1/10
USPC ........................................................ 106/407
See application file for complete search history.

(56) References Cited

U.S. PATENT DOCUMENTS

| | | | |
|---|---|---|---|
| 3,688,781 | A | 9/1972 | Talley, Jr. |
| 4,546,783 | A | 10/1985 | Lott |
| 4,793,423 | A | 12/1988 | Knol |
| 8,100,198 | B2 | 1/2012 | Fout et al. |
| 8,267,200 | B2 | 9/2012 | Fout et al. |
| 8,820,438 | B2 | 9/2014 | Ross et al. |
| 9,079,188 | B2 | 7/2015 | Culver |
| 2009/0139770 | A1* | 6/2009 | Fout ...................... E21B 21/063 175/66 |

FOREIGN PATENT DOCUMENTS

WO 198902774 A1 4/1989

OTHER PUBLICATIONS

Global Advantech Resources, "Aqueous Cleaning of Drilling Cuttings," Technology Data Sheet TDS4830; 2 pages.

* cited by examiner

*Primary Examiner* — Edward M Johnson
(74) *Attorney, Agent, or Firm* — Dunlap Codding, P.C.

(57) ABSTRACT

Methods and systems for desalination and decontamination for solid waste are disclosed. The method includes decontaminating a volume of contaminated, desalinated drill cuttings by removing at least a portion of contaminants associated with the contaminated, desalinated drill cuttings. The desalinated drill cuttings are drill cuttings that have been desalinated by a desalination unit.

14 Claims, 4 Drawing Sheets

DESALINATION AND DECONTAMINATION SYSTEM FOR SOLID WASTE

INCORPORATION BY REFERENCE

The present patent application claims priority to the provisional patent application identified by U.S. Ser. No. 63/033,540, filed on Jun. 2, 2020, the entire content of which is hereby incorporated herein by reference.

BACKGROUND

In the drilling of oil and gas wells, large volumes of waste material are produced known commonly as drill cuttings. The drill cuttings are primarily clay, rock, or other inert materials of the surrounding strata that are considered earthen material and are not regulated as a solid waste. However, during the drilling process the drill cuttings usually become intermixed with other hazardous organic materials, principally aliphatic and aromatic hydrocarbons, contained within drilling fluid or from the oil or gas reservoirs.

The drilling fluids are used to provide well bore lubrication to cool the drill bit, to protect against corrosion, and to provide a pressure head to maintain formation integrity. There are two main types of drilling fluids: water-based and oil-based. Oil-based drilling fluids are employed in operations where it is desirable to drill at elevated temperatures, improve bore hole stability, control shale sloughing, and control water wetting of formation such as in clay and some shale formations. The drill cuttings are usually separated from most of the drilling fluid at the drill site using vibrating screens, referred to as shale shakers, and centrifuges. However, the vibration screens are unable to completely separate all drill fluids from the drill cuttings; therefore, the drill cuttings generally retain a significant volume of drill fluid even after the initial separation process.

In other drilling operations, including operations that drill through large salt deposits, the drill cuttings may also contain large amounts of chlorides. Another source of the salts associated with the drill cuttings can be found in the oil-based muds which can utilize an emulsified phase of 20 to 35 percent by weight brine.

Contaminated, saline drill cuttings that are not properly disposed of can cause substantial pollution as the contaminants are gradually released from surface adhesion to the drill cuttings. Salts and other leachate, unlike hydrocarbons, cannot biodegrade but may accumulate in soils, which have a limited capacity to accept salts. If salt levels become too high, the soils may be irreparably damaged. Because the industry and the U.S. government want to avoid any such oil pollution, regulations governing the disposal of the drill cuttings have been promulgated.

Several different methods for disposing of contaminated, saline drill cuttings have been attempted. One method is to bury the solid waste in a pit at the drill site or a landfill. Burial is not a good option for wastes with high concentrations of salts and/or other contaminates as these harmful components could migrate from the burial site causing the contamination of the surrounding area. The waste can easily contaminate soil and groundwater when the hydrocarbons and other chemicals leach into the earth, and polluted groundwater can take years or even decades to dissipate and often spreads to other areas.

Another method is to apply the drill cutting waste to an area of land, in a treatment process known as land farming or land spreading, to allow a bioremediation process to naturally break down the hydrocarbon constituents using microorganisms contained within the soil. Using this method, salt management of the disposed waste can become quite burdensome due to the accumulation of salt in the soil which does not biodegrade. Additionally, the number of applications of the contaminated drill cuttings to the same area of land may be limited by the concentration of contaminates. Soil with highly concentrated contaminates, due to repeated applications, can lead to the destruction of the communities of organisms, affect plant growth, and render the land unusable.

Another method for disposal of drill cuttings is to recycle the material. Recycled drill cuttings can be used to stabilize surfaces, such as roads and drilling pads. The drill cuttings may also be used as an aggregate in concrete, brick, or block manufacturing. Before the drill cuttings can be used for these purposes, it may be necessary to reduce the hydrocarbon and salt content to an acceptable level.

SUMMARY

A desalination and decontamination system and method for solid waste are disclosed. The problem of removing salt and contaminants from drill cuttings is addressed by first removing at least a portion of the salt from the drill cuttings utilizing a desalination process followed by the removal of at least a portion of the contaminants from the drill cuttings utilizing a decontamination process. In some embodiments, at least a portion of other associated leachate may be removed during the desalination process. The desalination process is achieved by a desalination unit which mixes the drill cuttings in a reservoir with substantially fresh water to create a slurry. The salts associated with the drill cuttings are dissolved into the fresh water creating a brine and removed from the slurry when the brine is drained from the reservoir, thereby reducing the salinity of the drill cuttings. Thereafter, desalinated drill cuttings are transferred to a decontamination unit to conduct the decontamination process, via a conveyance system or other mechanical means. The decontamination process may include removing at least a portion of the contaminates associated with the drill cuttings through a thermal treatment, bioremediation, chemical separation, physical separation, recycling, or composting. Composting may include incorporating and mixing prescribed amounts of organic material (such as straw, grass clippings, manure, and or biosolids), nutrients (nitrogen, phosphorus and potassium), potentially innoculants, plus water into the contaminated, desalinated drill cuttings; and building a mound or windrow of mixed material (compost) and allowing microorganisms to break the hydrocarbon chains in a natural process. In one embodiment, the decontamination unit removes the remaining contaminants by exposing the desalinated drill cuttings to a heat energy within a decontamination chamber. The heat energy causes the vaporization of the contaminants which are then removed from the decontamination chamber for further processing. The desalinated, decontaminated drill cuttings may then be recycled or disposed of in an environmentally appropriate manner.

Consistent with an aspect of the present disclosure, a system may comprise a desalination unit, the desalination unit configured to mix the contaminated, saline drill cuttings with substantially fresh water to create a slurry, the desalination unit may comprise a desalination tank having a desalination reservoir and a drill cuttings inlet providing access to the desalination reservoir, the desalination reservoir receiving a volume of contaminated, saline drill cuttings via the drill cuttings inlet, the desalination tank having one or more water inlet providing access to the desalination reservoir, the desalination reservoir receiving a volume of substantially fresh water via the water inlet, the fresh water initially having a volume of saline below a predetermined limit, the desalination tank including a water outlet and a drill cutting outlet; one or more agitators associated with the desalination reservoir and configured to create a turbulent environment within the desalination reservoir, causing the fresh water to thoroughly mix with the contaminated, saline drill cuttings to form contaminated, desalinated drill cuttings; a decontamination unit receiving a volume of contaminated, desalinated drill cuttings, the decontamination unit configured may heat the contaminated, desalinated drill cuttings to vaporize a plurality of contaminants and water from the contaminated, desalinated drill cuttings, the decontamination unit may comprise a decontamination chamber; a drill cuttings inlet configured to allow contaminated, desalinated drill cuttings to be deposited within the decontamination chamber; a vapor outlet configured to remove vaporized contaminants and water from the decontamination chamber; and a decontaminated, desalinated drill cutting outlet, configured to allow a volume of decontaminated, desalinated drill cuttings to be removed from the system; and a conveyance system operable to transport the contaminated, desalinated drill cuttings from the desalination unit to the decontamination unit.

In an effort to maximize efficiency of the desalination/decontamination process, it is imperative that drill cuttings undergo the desalination process prior to the decontamination process. During the decontamination process, the drill cuttings may be exposed to temperatures between 500° F. and 1,300° F. in order to cause the vaporization of the contaminants. If the decontamination process were to take place before the desalination process, it would be necessary to allow a period of time for the drill cuttings to cool to an appropriate temperature before the desalination process could take place. The delay to allow the drill cuttings to cool would interrupt the entire process and potentially lead to a buildup of decontaminated drill cuttings waiting to be desalinated. However, if the drill cuttings were not permitted the time to cool to the appropriate temperature, the water intended to desalinate the drill cuttings could instantly be turned into steam upon contact with the hot drill cuttings, resulting in a larger requirement of water resources, potentially dangerous steam, and a further delay to the desalination process.

Conducting the decontamination process prior to the desalination process will result in an additional drying requirement involving supplemental equipment and resources. Desalinated drill cuttings are typically dried following the desalination process to reduce the weight and volume of the drill cuttings which in turn reduces transportation and management cost. When the decontamination process takes place after the desalination process, the decontamination process effectively serves to dry the drill cuttings in addition to removing contaminants. However, if the decontamination process were to take place before the desalination process, a second drying process would become necessary to reduce the water content of the drill cuttings.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
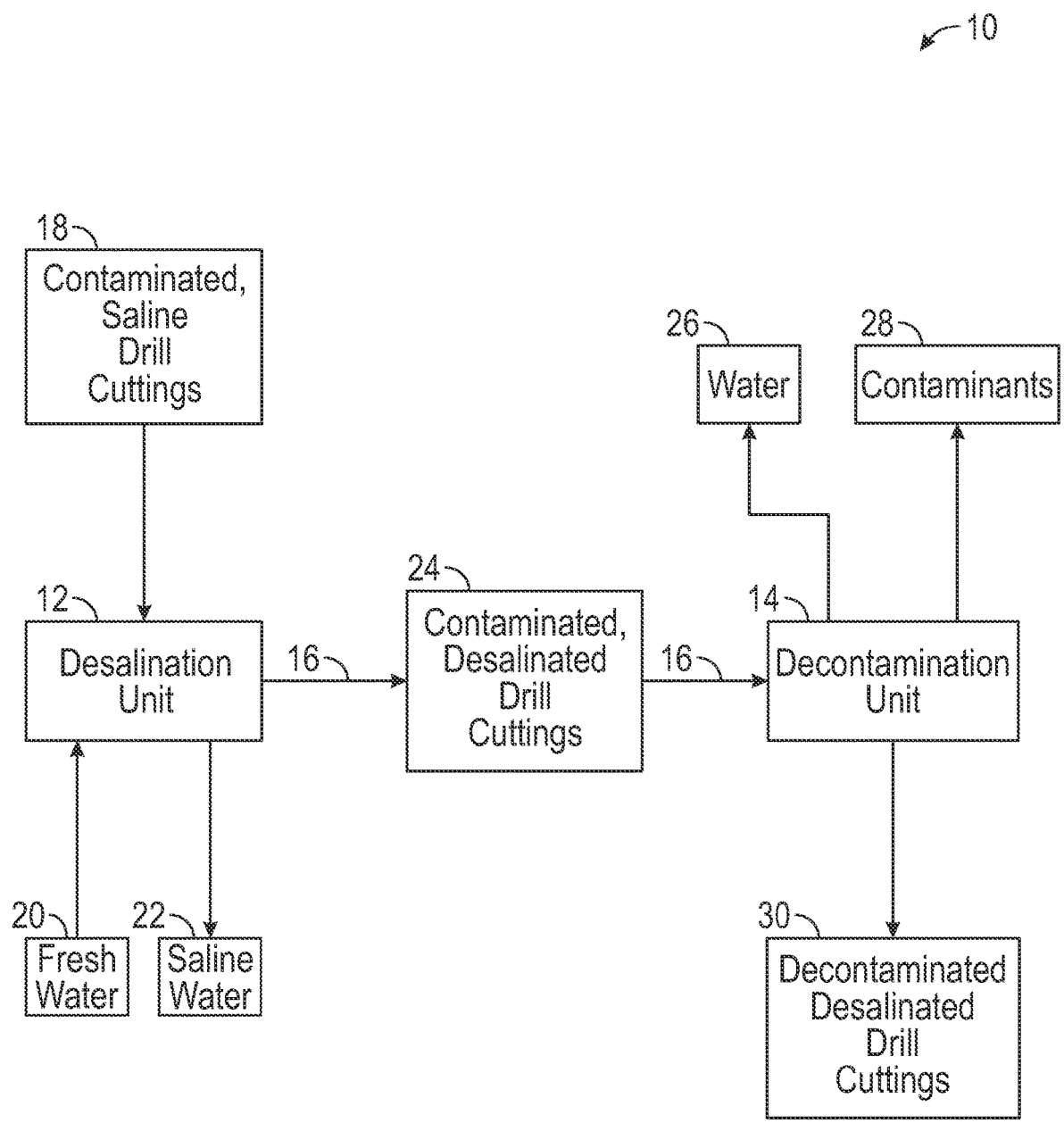
FIG. 1 is a schematic diagram of an exemplary embodiment of a desalination and decontamination system in accordance with the present disclosure.

The following detailed description refers to the accompanying drawings. The same reference numbers in different drawings may identify the same or similar elements.

The mechanisms proposed in this disclosure circumvent the problems described above. The present disclosure describes a system that reduces the concentration of salt contained within a volume of drill cuttings and then removes hydrocarbons and other contaminates from the volume of drill cuttings; therefore, allowing the decontaminated, desalinated drill cuttings to be disposed of in an environmentally acceptable manner.

Before explaining at least one embodiment of the inventive concept disclosed herein in detail, it is to be understood that the inventive concept is not limited in its application to the details of construction and the arrangement of the components or steps or methodologies set forth in the following description or illustrated in the drawings. The inventive concept disclosed herein is capable of other embodiments or of being practiced or carried out in various ways. Also, it is to be understood that the phraseology and terminology employed herein is for the purpose of description and should not be regarded as limiting in any way.

In the following detailed description of embodiments of the inventive concept, numerous specific details are set forth in order to provide a more thorough understanding of the inventive concept. It will be apparent to one of ordinary skill in the art, however, that the inventive concept within the disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

For convenience, the term "drilled cuttings" is used herein to refer to used drilling fluids, drilling solids and/or drilling fluid mud pit residues, slurries of such materials, and combinations thereof.

As used herein, the term "salinity" of a substance refers to an amount of dissolved or soluble salt, such as an alkali or alkaline earth metal, which, in solution, releases the same number of ions that would be released by the same amount of sodium chloride (NaCl). Drilled cuttings commonly contain sodium chloride (NaCl), potassium chloride (KCl), magnesium chloride ($MgCl_2$), and calcium chloride ($CaCl_2$), and the present process is well suited for reducing the salinity due to any or all of such salts and other leachate.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 100 units to 2000 units (for example where units may be parts per million) therefore refers to and includes all values or ranges of values of the units, and fractions of the values of the units and integers within said range, including for example, but not limited to 100 units to 1000 units, 100 units to 500 units, 200 units to 1000 units, 300 units to 1500 units, 400 units to 2000 units, 500 units to 2000 units, 500 units to 1000 units, 250 units to 1750 units, 250 units to 1200 units, 750 units to 2000 units, 150 units to 1500 units, 100 units to 1250 units, and 800 units to 1200 units. Any two values within the range of about 100 units to about 2000 units therefore can be used to set the lower and upper boundaries of a range in accordance with the embodiments of the present disclosure.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As discussed above, there exist a need for a system and method that removes the salt and contaminates from contaminated, saline drill cuttings so that the drill cuttings can be disposed of or reused in an environmentally responsible manner. The prior art addressed the removal of only salt or only contaminates, but did not address the removal of both salt and contaminates associated with drill cuttings. The present disclosure addresses these deficiencies with a methodology for reducing the salinity and contaminates associated with a volume of the drill cuttings by first rinsing the drill cuttings in a turbulent environment with fresh water, and then submitting the drill cuttings to a decontamination process, such as, exposing the desalinated (and possibly wet) drill cuttings to a heat energy that causes the vaporization of any remaining contaminates, preferably without drying the drill cuttings prior to introduction of the drill cuttings to the heat energy.

Referring now to FIG. 1, shown therein is an exemplary embodiment of a desalination and decontamination system 10 according to the instant disclosure. The desalination and decontamination system 10 comprise a desalination unit 12 and a decontamination unit 14 connected by a conveyance system 16. The desalination and decontamination system 10 may be located at a drilling site or may be at a location distinct from the drilling site. In some embodiments, the desalination unit 12 may not be connected to the decontamination unit 14 by the conveyance system 16, and may be located in different geographical locations. For example, the desalination unit 12 may be located at the drilling site, while the decontamination unit 14 is located elsewhere.

In one embodiment, contaminated, saline drill cuttings 18 and substantially fresh water 20, or water-based emulsion, are combined in the desalination unit 12. Fresh water, as used herein, is water with total dissolved solids (TDS) between zero and 2,000 parts per million (ppm). The desalination unit 12 is configured to mix the contaminated, saline drill cuttings 18 with the substantially fresh water 20 to create a slurry or solution. The slurry may be agitated causing salt associated with the contaminated, saline drill cuttings 18 to dissolve in the fresh water 20 creating a brine 22. Salinity content of the brine 22 is monitored. When the salinity content of the brine 22 exceeds a first amount (predetermined or dynamically determined), the brine 22 may then be removed from the slurry, and additional fresh water 20 may be added to the slurry. In one embodiment, the removal of the brine 22 from the slurry and the addition of fresh water 20 may be based on a salt water extraction bell curve. For example, once the salinity content has reached equilibrium, or a rate of exchange becomes minimal, the brine 22 is removed and replaced with fresh water 20. This process can be repeated until the salinity content of the water is stable and below a second amount. In one embodiment, the second amount may be established by a regulatory agency, such as, a chloride content less than 1,750 mg/kg, for example. Thus, this process causes the desalination of the contaminated, saline drill cuttings 18. The desalination unit 12 will be discussed in more detail below.

In one embodiment, once the salinity of the contaminated, desalinated drill cuttings 24 has been determined to be below a predetermined limit, the conveyance system 16 may be used to transport the contaminated, desalinated drill cuttings 24 from the desalination unit 12 to the decontamination unit 14. If the decontamination unit 14 is not collocated with the desalination unit 12, the contaminated, desalinated drill cuttings 24 may be removed from the desalination unit 12 and transported to the location of the decontamination unit 14 or otherwise stored until a decontamination process can be accomplished.

In one embodiment, the decontamination unit 14 receives the contaminated, desalinated drill cuttings 24 from the conveyance system 16. Water 26 and contaminants 28, such as hydrocarbons, may be removed from the contaminated, desalinated drill cuttings 24 by the decontamination unit 14 by heating the contaminated, desalinated drill cuttings 24 to a temperature at which the water 26 and the contaminants 28 are vaporized. The vaporized water 26 and contaminants 28 can then be removed from the contaminated, desalinated drill cuttings 24 for further processing. The decontaminated, desalinated drill cuttings 30 can then be removed from the decontamination unit 14 to be recycled or disposed of in an eco-friendly manner. The decontaminated, desalinated drill cuttings 30 being defined as drill cuttings having a total petroleum hydrocarbon (TPH) content between 0 mg/kg and 2,500 mg/kg TPH and a salt content between 0 mg/kg and 1,750 mg/kg. It should be understood that a higher TPH and salt content of the decontaminated, desalinated drill cuttings 30 may be acceptable. The decontamination unit 14 will be discussed in more detail below.

Figure 2:
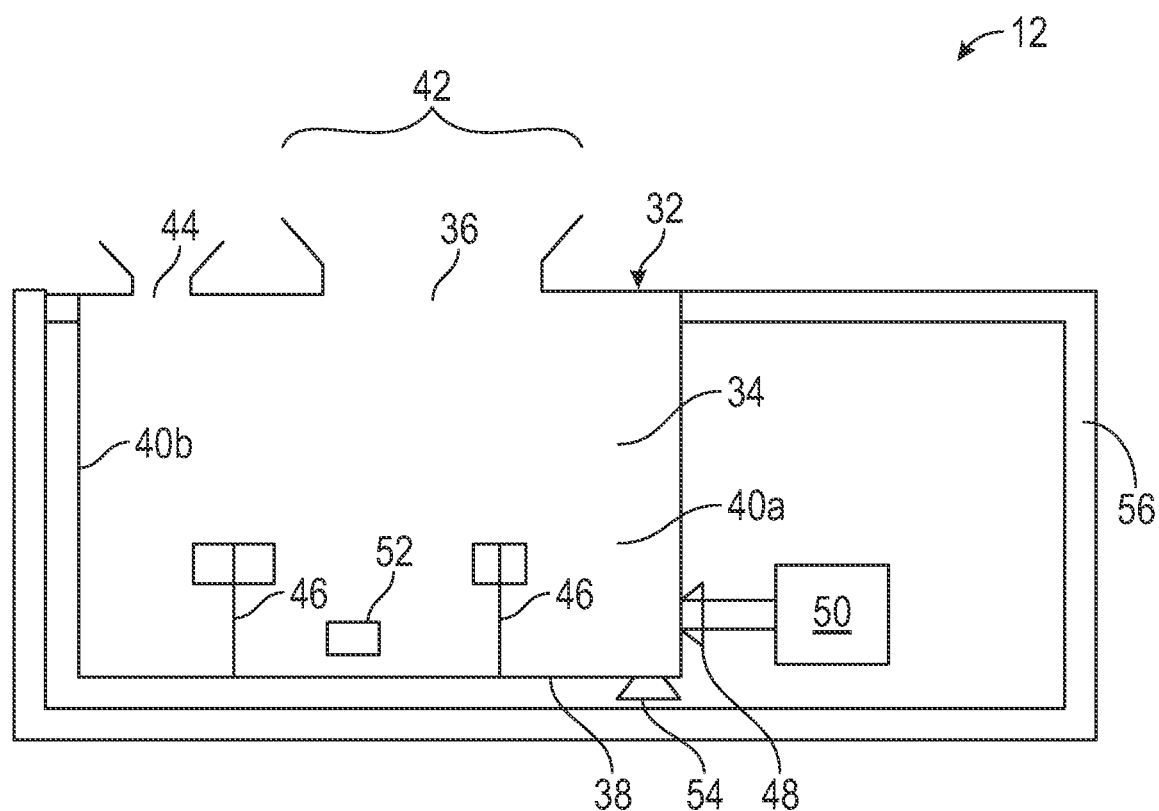
FIG. 2 is a partial elevation view of an exemplary embodiment of a desalination unit in accordance with the present disclosure.

FIG. 2 is a desalination unit 12 according to one embodiment of the present disclosure. As shown in FIG. 2, the desalination unit 12 includes a desalination tank 32, the desalination tank 32 having a desalination reservoir 34 and a contaminated, saline drill cuttings inlet 36 providing access to the desalination reservoir 34. In one embodiment, the desalination tank 32 may be a semi-cylindrical tank with a possible width of approximately ten feet and a length of approximately forty feet so that desalination tank 32 can be transported on the United States highway system. It should be understood that a size and shape of the desalination tank 32 is provided for exemplary purposes. The desalination tank 32 having a semi-cylindrical wall 38 with a long axis parallel to a ground surface, and an end wall 40a, 40b on each end of the semi-cylindrical wall 38 forming the desalination reservoir 34, and an open top 42 allowing contaminated, saline drill cuttings 18 to be deposited into the desalination reservoir 34. In the embodiment described above, the open top 42 may serve as the contaminated, saline drill cutting inlet 36, providing access to the desalination reservoir 34. In one embodiment, the contaminated, saline drill cuttings inlet 36 may be formed in the semi-cylindrical wall 38. In one embodiment, the contaminated, saline drill cuttings inlet 36 may be formed in the end walls 40a, or 40b.

As further shown in FIG. 2, the desalination tank 32 may receive a volume of substantially fresh water 20 via a one or more water inlet(s) 44. The one or more water inlet(s) 44 may be in fluid communication with a source of fresh water (not shown), such that, fresh water 20 may be delivered from the source of fresh water and provided to the desalination reservoir 34 via the one or more water inlet(s) 44. In one embodiment, the one or more water inlet(s) 44 may be proximate to the open top side 42 of the desalination tank 32 thereby allowing the fresh water 20 exiting the one or more water inlet(s) 44 to be deposited into the desalination reservoir 34. In one embodiment, the one or more water inlet(s) 44 may be adjacent to the end wall 40a, 40b. In one embodiment, the one or more water inlet(s) 44 may be located in the semi-cylindrical wall 38. There may be some advantage to locate the one or more water inlet(s) 44, at or near an upper portion of the desalination tank 32 to minimize a pressure requirement for providing water to the desalination reservoir 34 once the desalination reservoir 34 is filled with the contaminated, saline drill cuttings 18 and/or fresh water 20.

In one embodiment, the one or more water inlet(s) 44 may be a high-flow inlet, such as an open end of a pipe configured to provide a large volume of fresh water 20 to the desalination reservoir 34 over a short period of time. For example, the one or more water inlet(s) 44 may provide a flow rate between 100 to 1000 gallons per minute, or preferably greater than 200 gallons per minute. In one embodiment, the one or more water inlet(s) 44 may be high-pressure inlet, such as a jet nozzle configured to provide the fresh water 20 to the desalination reservoir 34 at a high pressure, such as a pressure between 50 psi to 300 psi, or preferably greater than 100 psi. The one or more water inlet(s) 44 may be any combination or number of high-flow inlets and high-pressure inlets. The one or more water inlet(s) 44 may include one or more water control valve(s) (not shown) to provide variability in a flow rate and/or a pressure of the fresh water 20. The fresh water 20 may be supplied to the desalination reservoir 34 via the one or more water inlet(s) 44 at any time during a desalination process. For example, the desalination reservoir 34 may be filled with fresh water 20 before the contaminated, saline drill cuttings 18, concurrent with the contaminated, saline drill cuttings 18, or after the contaminated, saline drill cuttings 18 have been deposited into the desalination reservoir 34. In one embodiment, at least a portion of the fresh water 20 provided to the one or more water inlet(s) 44 may be recirculated water.

The desalination unit 12 may include one or more agitator(s) 46 configured to create a turbulent environment within the desalination reservoir 34 similar to a whirlpool. The one or more agitator(s) 46 may be any type of device capable of causing the mixing of the fresh water 20 with the contaminated, saline drill cuttings 18, such as a blade mill, a paddle blade, a gate blade, a ribbon blade, and/or combination thereof, for example. In one embodiment, the one or more agitator(s) 46 may include high-pressure jet nozzles, configured to spray water at a high velocity onto the contaminated, saline drill cuttings 18. The high-pressure jet nozzles may provide greater than 200 gallons per minute at a pressure greater than 100 psi. The high-pressure jet nozzles may be arranged to spray water from one or more location(s) and directed to spray in one or more direction(s) within the desalination reservoir 34. The source of the water utilized by the high-pressure jet nozzles may be fresh water 20 or recirculated water obtained from within the desalination reservoir 34.

The desalination reservoir 34 may include a water outlet 48, the water outlet 48 being configured to remove brine 22 from the desalination reservoir 34. In one embodiment, the water outlet 48 may include a control valve (not shown) configured to control the flow of brine 22 being removed from the desalination reservoir 34. For example, the control valve may be closed (restricting the flow of brine 22) while the one or more water inlet(s) 44 is filling the desalination reservoir 34 with fresh water 20 and may be opened after the one or more agitator(s) 46 has mixed the fresh water 20 with the contaminated, saline drill cuttings 18 for a predetermined amount of time or until an amount of salt within the brine 22 is above a threshold. Alternatively, the control valve may be opened while the one or more water inlet(s) 44 is providing fresh water 20 to the desalination reservoir 34, allowing the fresh water 20 to pass through the contaminated, saline drill cuttings 18, and exit the desalination reservoir 34 via the water outlet 48. In one embodiment, the water outlet 48 may include one or more filter(s), a baffle, or other similar device to prevent the contaminated, saline drill cuttings 18 from being removed with the brine 22. In some embodiments, the brine 22 that is removed from the desalination reservoir 34 may undergo further processing to purify or otherwise desalinate the brine 22. The desalinated brine 22 may be reintroduced into the process as the fresh water 20.

In some embodiments, the desalination unit 12 may include a solid separator 50, such as a desander, desilter, hydrocyclone, or combination thereof, in fluid communication with the water outlet 48. The solid separator 50 may be configured to remove any fine particles of contaminated, saline drill cuttings 18 suspended in the brine 22 that is removed from the desalination reservoir 34. The fine particles of contaminated, saline drill cuttings 18 collected by the solid separator 50 may then be returned to the desalination reservoir 34 for further processing.

The desalination unit 12 may include a salinometer 52, the salinometer 52 being a measuring device capable of determining salt content of the contaminated, saline drill cuttings 18, the brine 22 or combinations thereof. In one embodiment, the salinometer 52 may determine the salinity of the contaminated, saline drill cuttings 18 by passing an electric current through the brine 22 of the slurry and measuring the conductivity of the brine 22. In one embodiment, the salinometer 52 may be locate within the desalination reservoir 34, such that a sensing portion of the salinometer 52 would be submerged in the brine 22. In one embodiment, the salinometer 52 may be located external to the desalination reservoir 34, for example, the salinometer 52 may be positioned to measure the brine 22 after the brine 22 is removed from the desalination reservoir 34 via the water outlet 48. The salinometer 52 may be configured to provide an indication that the salinity of the contaminated, saline drill cuttings 18 is within a predetermined limit, such as between 0 mg/kg and 1,750 mg/kg. The desalination unit 12 may include a XRF (X-ray fluorescence) analyzer (not shown) or other similar measuring device, the XRF analyzer being capable of determining the content of leachate other than salt that is associated with the contaminated, saline drill cuttings 18, the brine 22 or combinations thereof.

The desalination reservoir 34 may include a contaminated, desalinated drill cuttings outlet 54. After the salinity of the contaminated, desalinated drill cuttings 24 is determined to be below the predetermined limit, the contaminated, desalinated drill cuttings 24 may be removed from the desalination reservoir via the contaminated, desalinated drill cuttings outlet 54. The contaminated, desalinated drill cuttings outlet 54 may be located at the base of desalination reservoir 34 to allow gravity to direct the contaminated, desalinated drill cuttings 24 toward the contaminated, desalinated drill cuttings outlet 54. In one embodiment, the contaminated, desalinated drill cutting outlet 54 and the water outlet 48 may be collocated. In one embodiment, an auger conveyor, or other similar mechanical device, may be located within the desalination reservoir 34 and used to direct the contaminated, desalinated drill cuttings 24 toward and through the contaminated, desalinated drill cuttings outlet 54. In one embodiment, the open top 42 may serve as the contaminated, desalinated drill cuttings outlet 54, wherein heavy equipment, such as a trackhoe or other similar type of excavator, may be used to remove the contaminated, desalinated drill cuttings 24 from the desalination reservoir 34.

The desalination unit 12 may be located within a support framework 56, such as an intermodal container frame. The support framework 56 may allow for relatively easy transportation of the desalination unit 12 between drilling location. Alternatively, the desalination unit 12 may be permanently mounted at a desalination location. In this instance, the contaminated, salinated cuttings would be transported to the desalination location and loaded into the desalination unit 12.

Figure 3:
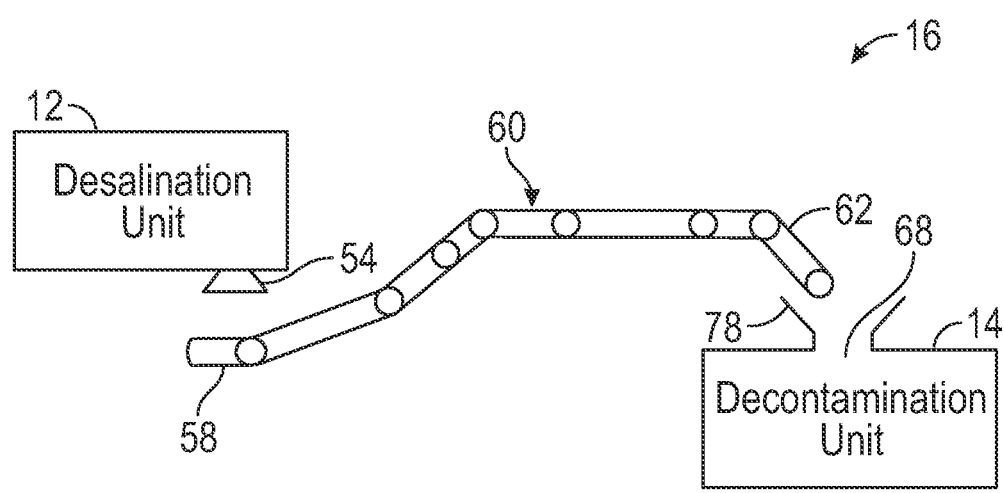
FIG. 3 is a schematic diagram of an exemplary embodiment of the desalination and decontamination system of FIG. 1 having a conveyance system in accordance with the present disclosure for conveying contaminated, desalinated drill cuttings from the desalination unit to a decontamination unit.

FIG. 3 depicts the conveyance system 16 according to one embodiment of the present disclosure. The conveyance system 16 is configured to transfer the contaminated, desalinated drill cuttings 24 from the desalination unit 12 to the decontamination unit 14. The conveyance system 16 may include a receiving end 58, a conveyor pathway 60, and an output end 62. The receiving end 58 may be proximate to the contaminated, desalinated drill cuttings outlet 54, such that the contaminated, desalinated drill cuttings 24 exiting the desalination reservoir 34 via the contaminated, desalinated drill cuttings outlet 54 may be deposited directly onto the receiving end 58.

The conveyor pathway 60 may extend from the receiving end 58 to the output end 62. The conveyor pathway 60 may include one or more conveyors, such as a belt conveyor, bucket conveyor, screw conveyor, spiral conveyor, pneumatic conveyor, sling conveyor, track hoe, front end loader, backhoe, super vacs and the like. A length of the conveyor pathway 60 will be dependent upon the distance between the desalination unit 12 and the decontamination unit 14, which may be as short as several feet or as long as several hundred feet.

The output end 62 is configured to provide the contaminated, desalinated drill cuttings 24 to the decontamination unit 14.

The conveyance system 16 may include a variable speed control (not shown) to provide adjustability regarding a transfer rate of contaminated, desalinated drill cuttings 24 from the desalination unit 12 to the decontamination unit 14. The transfer rate may be limited by a rate at which the contaminated, desalinated drill cuttings 24 can be removed from the desalination unit 12 or provided to the decontamination unit 14. In some embodiments, the variable speed control may be required to start and stop the conveyance system 16 as necessary to provide the contaminated, desalinated drill cuttings 24 at the rate the decontamination unit 14 can process the contaminated, desalinated drill cuttings 24. Other manners or mechanisms other than a conveyance system 16 may be used to transfer the contaminated, desalinated drill cuttings 24 from the desalination unit 12 to the decontamination unit 14, such as a truck, a cart, a rail car, or the like.

Figure 4:
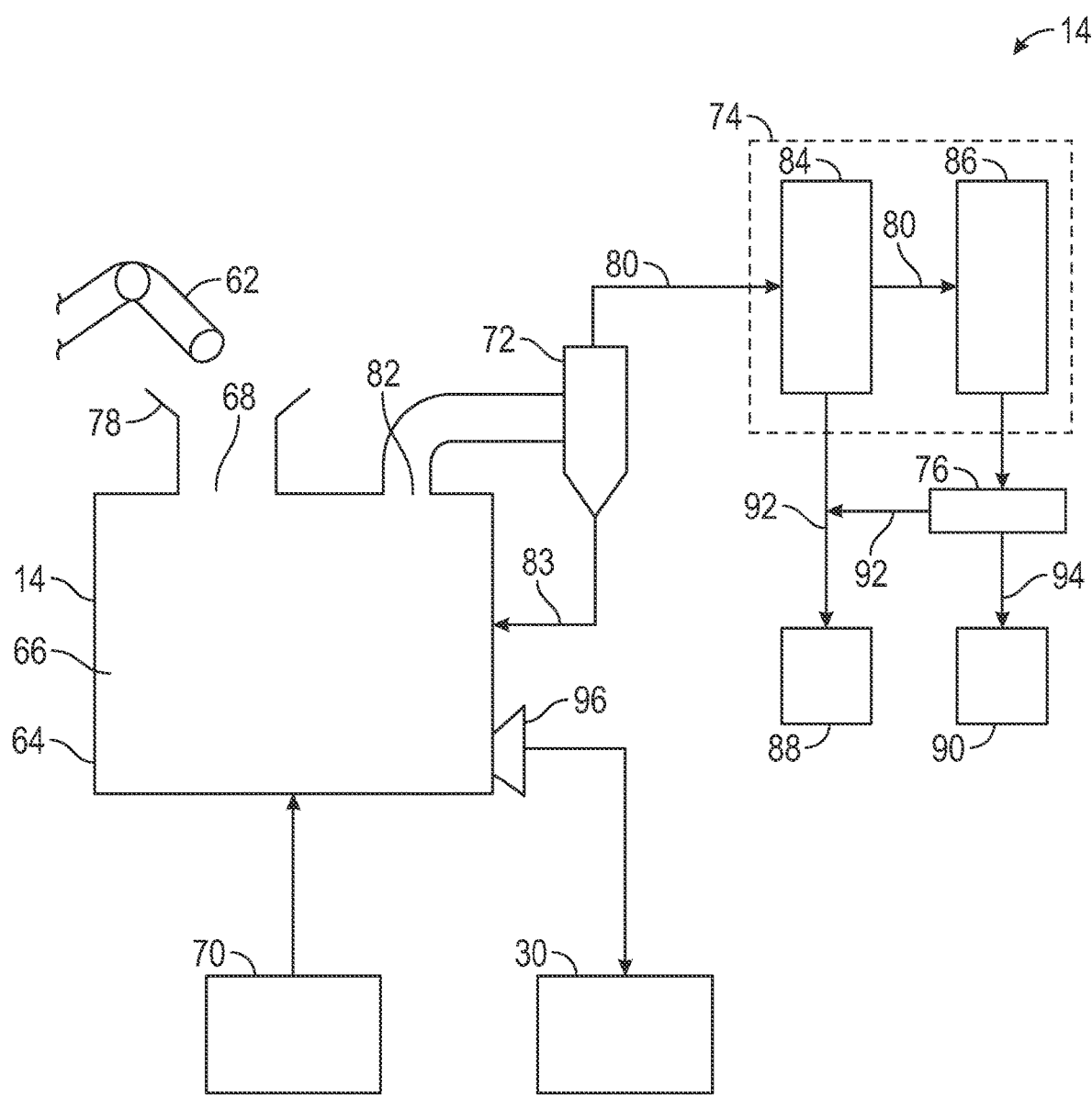
FIG. 4 is schematic diagram of an exemplary embodiment of the decontamination unit in accordance with the present disclosure.

FIG. 4 shows an example of the decontamination unit 14 that uses thermal treatment to remove contaminants in greater detail. The decontamination unit 14 may include a decontamination vessel 64, the decontamination vessel 64 having a decontamination chamber 66 and a contaminated, desalinated drill cuttings inlet 68 providing access to the decontamination chamber 66. The contaminated, desalinated drill cuttings 24 enter the decontamination vessel 64 via the contaminated, desalinated drill cuttings inlet 68, and are deposited in the decontamination chamber 66. The decontamination unit 14 may further include a thermal energy source 70, a cyclone separator 72, a condenser 74, and an oil water separator 76. In one embodiment, the decontamination unit 14 may be configured for a continuous decontamination process in which a steady flow of the contaminated, desalinated drill cuttings 24 are processed through the decontamination unit 14. In one embodiment, the decontamination unit 14 may be configured to intermittently process the contaminated, desalinated drill cuttings 24, wherein a certain volume of contaminated, desalinated drill cuttings 24 are provided to the decontamination chamber 66 for decontamination at a given time.

The contaminated, desalinated drill cuttings inlet 68 may be located proximate to the output end 62 to allow the contaminated, desalinated drill cuttings 24 exiting the conveyance system 16 at the output end 62 to be received at the contaminated, desalinated drill cuttings inlet 68. The contaminated, desalinated drill cuttings inlet 68 may include a control mechanism, such as a gate, flap, door, valve, or other similar type of barrier that may be opened or closed to control the flow of contaminated, desalinated drill cuttings 24 into the decontamination chamber 66.

In one embodiment, the decontamination unit 14 may include a hopper 78. The hopper 78 is positioned to receive the contaminated, desalinated drill cuttings 24 exiting the conveyance system 16 at the output end 62 and funnel the contaminated, desalinated drill cuttings 24 to the contaminated, desalinated drill cuttings inlet 68. The hopper 78 may be of a sufficient size to receive and temporarily store the volume of contaminated, desalinated drill cuttings 24 until the decontamination vessel 64 is able to receive the contaminated, desalinated drill cuttings 24.

The thermal energy source 70 may provide a thermal energy in the form of heat to the decontamination chamber 66 and more specifically to the contaminated, desalinated drill cuttings 24 contained within the decontamination chamber 66. The thermal energy provided by the thermal energy source 70 may be of sufficient intensity and duration to cause the water and contaminates associated with the contaminated, desalinated drill cuttings 24 to be vaporized, creating a vapor 80. The thermal energy may be transferred to the contaminated, desalinated drill cuttings 24 through conduction, convection, and/or radiation. In one embodiment, direct hot gases, generated by thermal energy source 70, may be directed toward the contaminated, desalinated drill cuttings 24. In another embodiment, the thermal energy source 70 may include a thermomechanical cuttings cleaner that utilizes frictional heat generated by a hammer mill as the contaminated, desalinated drill cuttings 24 are ground into a fine powder. In yet another embodiment, the thermal energy source 70 may include a microwave that directly heats the water and contaminates by exposing the contaminated, desalinated drill cuttings 24 to electromagnetic radiation in the microwave frequency range. It should be understood that other methods for heating drill cuttings are well known by those skilled in the art, and the aforementioned embodiments are provided for exemplary purposes.

The decontamination vessel 64 may include a vapor outlet 82 that is in fluid communication with the decontamination chamber 66. The vapor outlet 82 may provide a pathway through which the vapor 80 can be removed from the decontamination chamber 66. The vapor outlet 82 may be in fluid communication with the cyclone separator 72.

The cyclone separator 72 removes fine particles of contaminated, desalinated drill cuttings 24 present in the vapor 80 removed from the decontamination chamber 66. The cyclone separator 72 may be in fluid communication with the condenser 74.

The condenser 74 is configured to condense the vapor 80 into a liquid state through cooling. In some embodiments, the condenser 74 may comprise an oil condenser 84 and a water condenser 86. The oil condenser 84 cools the vapor 80 to a temperature at which an oil portion of the vapor 80 is condensed yet a water portion of the vapor 80 remains in gas form (between 220° and 230° F.). The water condenser 86 is configured to receive the remaining uncondensed vapor 80 from the oil condenser 84 and cool the vapor 80 to a temperature that allows for the condensation of the water 26.

The condenser 74 may be in fluid communication with the oil water separator 76. The oil water separator 76 is configured to separate a condensed oil and water mixture into separate liquid components. The decontamination unit 14 may include an oil tank 88 and a water tank 90 configured to receive and store the condensed oil 92 and condensed water 94, respectively. In some embodiments, a portion of condensed oil 92 may be used as a fuel for the thermal energy source 70 and/or other systems associated with the desalination and decontamination system 10. Similarly, a portion of the condensed water 94 may be obtained from the water tank 90 to be used as the fresh water 20 for the desalination unit 12.

Returning now to the decontamination chamber 66, the decontaminated, desalinated drill cuttings 30 remain in the decontamination chamber 66 after the contaminates 28 (see FIG. 1) are vaporized and the vapor 80 is removed via the vapor outlet 82. The decontamination vessel 64 may include a decontaminated, desalinated drill cuttings outlet 96 to provide access for the removal of the decontaminated, desalinated drill cuttings 30.

An example of one embodiment of the desalination and decontamination system 10 in use in accordance with the present disclosure will be described. Contaminated, saline drill cuttings 18 from an oil or gas well are collected and deposited into the desalination reservoir 34 of the desalination tank 32, typically, at atmospheric temperature and atmospheric pressure. Prior to depositing the contaminated, saline drill cuttings 18 into the desalination reservoir 34, the contaminated, saline drill cuttings 18 may be subjected to an initial screening device, such as a shale shaker, to separate the contaminated, saline drill cuttings 18 from the drilling fluid. A volume of substantially fresh water 20 is added to the desalination reservoir 34 via the one or more water inlet(s) 44 to completely saturate the contaminated, saline drill cuttings 18 and create the slurry. The fresh water 20 may be added to the desalination reservoir 34 before, during or after the contaminated, saline drill cuttings 18 are deposited into the desalination reservoir 34. The slurry is thoroughly mixed by the one or more agitator(s) located within the desalination reservoir 34 to ensure sufficient saturation and breaking of lumps of the contaminated, saline drill cuttings 18.

The salinometer 52 obtains a measurement of the salinity of the slurry once the slurry has become a homogeneous mixture. If the salinometer 52 determines the salinity of the slurry is not below the predetermined limit, such as 2500 ppm, then the brine 22 is removed from the desalination reservoir 34 utilizing the water outlet 48. Fresh water 20 is then added to the desalination reservoir 34 and mixed with the contaminated, saline drill cuttings 18 to form a slurry. The desalination process of draining brine 22, added fresh water 20, and mixing into a slurry is repeated until the salinometer 52 determine the salinity of the slurry is below the predetermined limit. Once the salinity of the slurry is determined to be below the predetermined limit, the brine 22 is removed from the desalination reservoir 34, followed by the removal of the contaminated, desalinated drill cuttings 24 via the contaminated, desalinated drill cuttings outlet 54.

The contaminated, desalinated drill cuttings 24 exit the desalination reservoir 34 at the contaminated, desalinated drill cuttings outlet 54 and are provided to the receiving end 58 of the conveyance system 16. In some embodiments, the contaminated, desalinated drill cuttings 24 are wet with the brine 22 and are at atmospheric temperature. The conveyance system 16 transfers the contaminated, desalinated drill cuttings 24 from the desalination unit 12 to the decontamination unit 14 along the conveyor pathway 60. The contaminated, desalinated drill cuttings 24 exit the output end 62 of the conveyance system 16 and are provided to the decontamination unit 14. In one embodiment, the contaminated, desalinated drill cuttings 24 are not dried or heated prior to introducing the contaminated, desalinated drill cuttings 24 into the decontamination unit 14.

The contaminated, desalinated drill cuttings 24 enter the decontamination vessel 64 of the decontamination unit 14 via the contaminated, desalinated drill cuttings inlet 68, and are deposited in the decontamination chamber 66. The thermal energy source 70 generates and provides the thermal energy to the decontamination chamber 66. The contaminated, desalinated drill cuttings 24 are exposed to the thermal energy of a sufficient intensity and for a sufficient duration to achieve a predetermined TPH content through vaporization of contaminates. For example, in order to obtain a TPH content of less than 1 percent, the contaminated, desalinated drill cuttings 24 may be heated to a temperature of 500° C. for a duration of ten minutes. The vaporization of water and contaminates form the vapor 80 within the decontamination chamber 66. The vapor 80 is removed from the decontamination chamber 66 via the vapor outlet 82 and provided to the cyclone separator 72. The cyclone separator 72 removes fine particles 83 of contaminated, desalinated drill cuttings 24 associated with the vapor 80 and provides the vapor 80 to the condenser 74. The fine particles 83 of contaminated, desalinated drill cuttings 24 may be returned to the decontamination chamber 66 for further processing. The condenser 74 cools the vapor 80 to the temperature at which condensation of the vapor 80 takes place. In one embodiment, the oil condenser 84 first cause the oil portion of the vapor 80 to be condensed by reducing the temperature below the point at which the oil condenses, but above the vaporization temperature for water. Thereafter, the water condenser 86 condenses the remaining vapor 80 by further reducing the temperature of the vapor 80. The oil water separator 76 is then used to remove any oil that was carried over to the water condenser 86. The condensed oil 92 and condensed water 94 may then be transferred to the oil tank 88 and water tank 90 for storage or re-use by the desalination and decontamination system 10.

Once the TPH content has been reduced to an acceptable level through the vaporization of the contaminants, the decontaminated, desalinated drill cuttings 30 are removed from the decontamination chamber 66 via the decontaminated, desalinated drill cuttings outlet 54.

Figure 5:
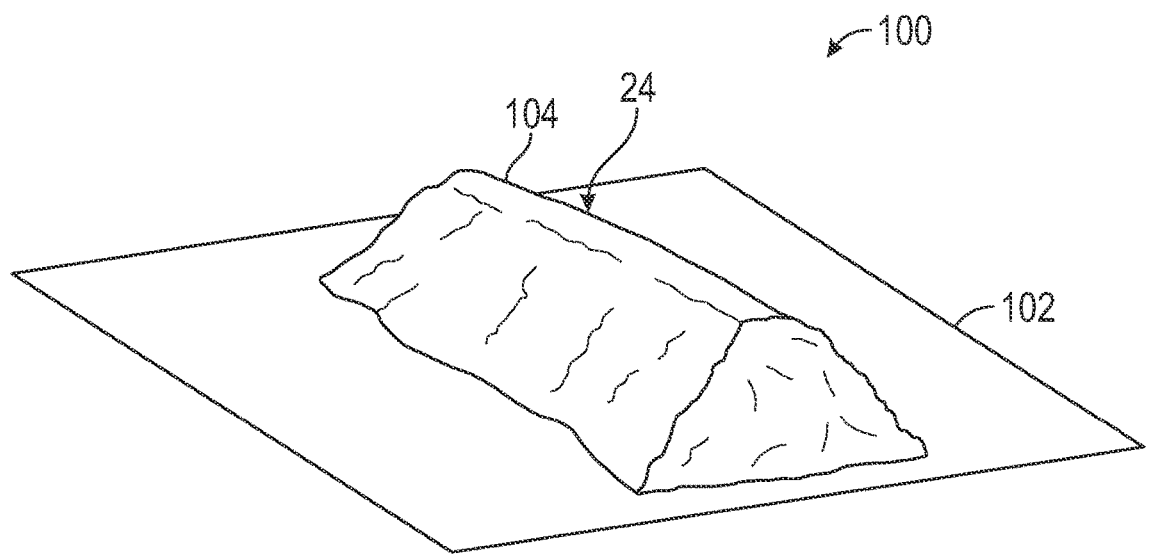
FIG. 5 is a perspective view of a decontamination unit that uses composting, through a controlled process, to cause the natural decomposition of contaminates found in contaminated, desalinated drill cuttings in accordance with the present disclosure.
Figure 6:
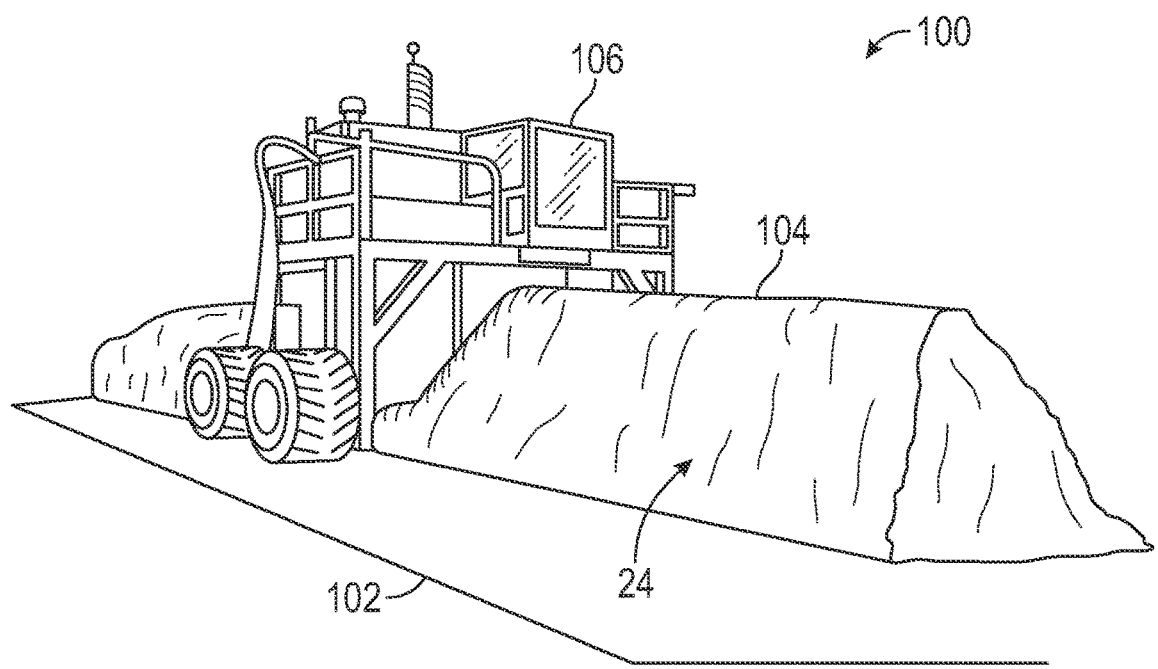
FIG. 6 is a perspective view of a compost windrow turner configured to pass over a windrow, and combine and mix the contaminated, desalinated drill cuttings with a secondary source of nutrient rich organic materials, such as, for example, hay, manure, grass clippings, and combinations thereof in accordance with the present disclosure.

Shown in FIG. 5 and FIG. 6 is a decontamination unit 100 that uses composting, through a controlled process, to cause the natural decomposition of the contaminates found in the contaminated, desalinated drill cuttings 24. The decontamination unit 100 may include a surface 102 and a windrow 104 of contaminated, desalinated drill cuttings 24. Composting requires introduction of prescribed ingredients into the windrow 104 and repeated maintenance to achieve optimum hydrocarbon degradation or composting.

The surface 102 may be constructed of a rigid material having a high loadbearing capability to support a substantially large quantity of contaminated, desalinated drill cuttings 24, as well as, any heavy equipment that may be used to move or otherwise interact with the contaminated, desalinated drill cuttings 24. The surface 102 may be constructed of a non-porous material or treated with a sealant to prevent seepage of the contaminates through the surface 102. For example, the surface 102 may be sealed concrete. In one embodiment, the surface 102 may include a clay liner or a geomembrane liner overlaid with material. In one embodiment, the surface 102 may include a leachate collection system with a geomembrane and compacted clay liner. In one embodiment, the surface 102 may include a slope configured to direct rainfall runoff into the leachate collection system.

As depicted in FIG. 5, the windrow 104 of contaminated, desalinated drill cuttings 24 may be arranged in a triangular shape having a base width of approximately five feet to approximately twenty feet and a height of approximately three feet to approximately ten feet and extending a length of only 3 feet to approximately 300 feet. It will be understood that the size and shape of the windrow 104 may be smaller or larger than described above based on a number of factors. The factors may include, but are not limited to, a size of the surface 102, quantity of contaminated, desalinated drill cuttings 24, types of contaminates, and environmental conditions, for example.

In some embodiments, the surface 102 and windrow 104 may be at least partially enclosed within a building (not shown) including one or more wall(s) and a roof to provides at least some control of the environmental conditions to which the windrow 104 is exposed. In one embodiment, the decontamination unit 100 may include a cover (not shown), such as a tarp or blanket, that lays directly on top of the windrow 104. The cover may be used to control the moisture content of the windrow 104, regulate gas levels within the windrow 104, and provide thermal insulation to the windrow 104.

In one embodiment, the decontamination unit 100 may include a compost windrow turner 106 configured to pass over the windrow 104, and combine and mix the contaminated, desalinated drill cuttings 24 with a secondary source of nutrient rich organic materials (not shown), such as, for example, hay, manure, grass clippings, and combinations thereof. The compost windrow turner 106 may be configured to add and mix water or dry material as necessary to establish a desired moisture content of the contaminated, desalinated drill cuttings 24. The compost windrow turner 106 may also be configured to introduce into the contaminated, desalinated drill cuttings 24 one or more colonies of microorganisms (not shown). The compost windrow turner 106 may be configured to mix the contaminated, desalinated drill cuttings 24 with the secondary source of nutrient rich organic materials, water, and colonies of microorganisms prior to forming the windrow 104. In some embodiments, the compost windrow turner 106 may be used to periodically mix the windrow 104 throughout the composting process. The compost windrow turner 106 may be a commercially available windrow turner.

In one embodiment, the decontamination unit 100 may include an aeration system (not shown) configured to provide an appropriate level of oxygen within the windrow and removal of waste gases. The aeration system, may utilize positive or negative aeration in which one or more tubes (not shown) are positioned within or near the windrow 104 to provide a channel in which oxygen may be introduced to the windrow 104 and waste gases can be removed from the windrow 104. As depicted in FIG. 6, the compost windrow turner 106 may be utilized to provide mechanical aeration of the windrow 104.

In one embodiment, the decontamination unit 100 may further comprise a thermometer (not shown), such as a compost thermometer, having a probe approximately three feet to six feet in length. The thermometer can be used to determine the internal temperature of the windrow 104.

In use, the contaminated, desalinated drill cuttings 24 are received by the decontamination unit 100 via the conveyance system 16 or other mechanical means after having undergone the desalination process to remove at least a portion of the salt associated with the drill cuttings. The contaminated, desalinated drill cuttings 24 may initially be sent to the compost windrow turner 106 of the decontamination unit 100 to receive organic materials (not shown) prior to being introduced into the windrow 104. The organic materials may be from a secondary source of nutrient rich organic materials such as a hay, manure and/or grass clippings. If the contaminated, desalinated drill cuttings 24 were deficient in nutrients, the contaminated, desalinated drill cuttings 24 could be enhanced via fertilizers to achieve an adequate carbon to nitrogen ratio (e.g., target of approximately 30:1) of the windrow 104. Other materials could be added at this time to adjust other attributes such as pH (elemental sulfur or aluminum sulfate, etc.). Lab analysis of the contaminated, desalinated drill cuttings 24 can be a cause for changes in the organic material and nutrient requirements.

Water may also be added by the compost windrow turner 106. Since the contaminated, desalinated drill cuttings 24 would be shaped into the windrow 104 by the compost windrow turner 106 after being desalinated by the desalination unit 12; the contaminated, desalinated drill cuttings 24 would be sufficiently saturated for the onset of the composting process. In the event the windrow 104 is over saturated, the windrow 104 could be dried by adding additional dry materials, mechanical mixing and/or aerating of the windrow 104. Field test of meters (not shown) can be utilized to determine ideal moisture content.

Colonies of microorganisms could be introduced into the windrow 104 from the organic materials (hay, grass clippings and/or manure). It is also possible to inoculate the windrow 104 with additional microorganism colonies upon determination that the microorganism activity is insufficient.

Once contaminated, desalinated drill cuttings 24 have been laid into the windrow 104 (via the conveyance system, loader, spreader or dump truck) with the organic materials; such as a round bale per five feet of windrow 104, plus five yards of manure; the natural process begins. Beneficial bacteria thrive at temperatures ranging from approximately 55-170 degrees Fahrenheit; with optimum hydrocarbon degradation occurring around 120-140 degrees. Temperatures below 55 degrees reduce bacteria activity/degradation and above 140 degrees the bacterial population begin to perish. Managing temperature enhances optimum degradation, the bacteria generate heat as the bacteria metabolism is raised. The windrow 104 is preferably maintained with good particle size distribution and porosity for natural convection to occur. Oxygen for microbial population is provided via the aeration system or through mechanical aeration; to prevent anaerobic microbes from becoming prevalent and fermentation occurring.

In one embodiment, the compost windrow turner 106 is used to maintain temperature, oxygen and water levels within the windrow 104. As temperatures of a windrow 104 push the upper bound, the windrow 104 can be turned (exchanging the inside of the windrow with the outside). The same could be true in the event the fertility and moisture is correct but the temperature doesn't lift off due to lack of microbial activity (could be due to overly saturated or lack of oxygen); the windrow 104 likely needs to be turned in this instance as well.

As the windrow 104 cures, most likely after several additions of water and multiple turnings by the compost windrow turner 106; the temperatures of the windrow 104 will begin to taper off. This is a common sign the hydrocarbons have been massively reduced and the windrow 104 is becoming more stable. Once the windrow 104 temperature (as gauged via the thermometer) has been reduced to ambient temperature; the composting process has been completed and samples can be collected for analysis to verify the hydrocarbon degradation and other attributes.

The decontaminated, desalinated drill cuttings 30 that have been composted are suitable for soil amendments or can be screened and distributed based upon particulate size (clays, silts, sands, and gravel fractions).

The decontamination process by composting may have several advantages over bioremediation of the contaminated, desalinated drill cuttings 24 that is achieved by land application. Land application applies a thin layer(s) (approximately ¼ inch) of contaminated drill cuttings over large areas of land and utilizes existing microorganisms and nutrient in the environment to break the hydrocarbon chain (primarily diesel) over time. Land application requires vast volumes of land to apply the desalinated drill cuttings 24 such as 20 acres per well; whereas composting the same volume can be handled in a single windrow 104 to achieve the same result of breaking the hydrocarbon chain on the surface 102 of less than 4,000 square feet. In lieu of this surface area differential, composting is more desirable for a commercial facility than land application. Secondly, once completed composting allows for recovery of the composted materials for other beneficial uses; a nutrient rich material that can be used for enhancing soils or can be screened into various fractions/products for potential resale. Composting by forming the windrow 104 can accelerate the natural process of breaking down the hydrocarbon chain, thereby reducing the time for the decontamination process.

Accordingly, as noted above, a volume of cleaned drill cuttings that can be re-used or disposed of in an environmentally appropriate manner may be realized consistent with the present disclosure in which the desalination unit 12 and decontamination unit 14 may be employed to remove at least a portion of salt and at least a portion of contaminates associated with the drill cuttings.

Other embodiments will be apparent to those skill in the art from consideration of the specification. It is intended that the specification and examples be considered as exemplary only, with a true scope and spirit of the invention being indicated by the following claims.

CONCLUSION

Conventionally, salt or other leachate associated with drill cuttings from oil and gas wells was not removed from the drill cuttings prior to a decontamination process used to remove hydrocarbons from the drill cuttings, if the salt was removed at all prior to disposal. In accordance with the present disclosure, the salinity of the drill cuttings is reduced to a predetermined level prior to the removal of other contaminates, allowing the decontaminated, desalinated drill cuttings to be disposed of in an environmentally acceptable manner.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A method comprising:
   decontaminating a volume of contaminated, desalinated drill cuttings by removing at least a portion of contaminants associated with the contaminated, desalinated drill cuttings, the contaminated, desalinated drill cuttings being drill cuttings that have been desalinated by a desalination unit.
2. The method of claim 1, wherein the contaminants include at least a portion of hydrocarbon oil.
3. The method of claim 1, wherein the contaminated, desalinated drill cuttings being defined as having a salt concentration within a predetermined limit, the predetermined limit being between 0 mg/kg and 1,750 mg/kg.
4. The method of claim 3, wherein the desalination unit is configured to reduce the salt concentration of the drill cuttings by rinsing the drill cuttings with fresh water until the salt concentration of the drill cuttings is below the predetermined limit.
5. The method of claim 1, wherein decontaminating a volume of contaminated, desalinated drill cuttings is accomplished by heating the volume of contaminated, desalinated drill cuttings to a temperature at which contaminants are vaporized and the volume of contaminated, desalinated drill cuttings is sustained at the heated temperature for a predetermined duration.
6. The method of claim 5, further comprising:
   removing at least a portion of the vaporized contaminants from the contaminated, desalinated drill cuttings.
7. The method of claim 6, further comprising:
   condensing at least a portion of the vaporized contaminants, and recycling at least a portion of the condensed contaminants.
8. The method of claim 1, further comprising:
   disposing of a volume of decontaminated, desalinated drill cuttings through a process of land treatment.
9. The method of claim 8, wherein the volume of decontaminated, desalinated drill cuttings has a salt concentration of between 0 mg/kg and 1,750 mg/kg, and a total petroleum hydrocarbon content between 0 mg/kg and 2,500 mg/kg.
10. The method of claim 1, wherein decontaminating a volume of contaminated, desalinated drill cuttings includes composting, through a controlled process, to cause decomposition of the contaminants found in the contaminated, desalinated drill cuttings.
11. The method of claim 10, wherein composting includes applying the contaminated desalinated drill cuttings on to surface and forming a windrow of contaminated, desalinated drill cuttings positioned on the surface.
12. The method of claim 11, further comprising the step of varying at least one of a moisture content of the windrow, a gas level within the windrow, and a temperature of the windrow.
13. The method of claim 11, wherein composting is further defined ascombining and mixing the contaminated, desalinated drill cuttings with at least one of organic material, water, and microorganisms.
14. The method of claim 11, wherein composting is further defined as aerating the contaminated, desalinated drill cuttings.

* * * * *